INVENTORS
BOB N. NAYDAN
SIDNEY SACKS
BY
Karl A. Ohralik
ATTORNEY

CHARGE GATED ANALOG-TO-DIGITAL CONVERTER

Filed Dec. 30, 1966 3 Sheets-Sheet 2

INVENTORS
BOB N. NAYDAN
SIDNEY SACKS
BY Karl A. O Hrake
ATTORNEY

March 10, 1970 B. N. NAYDAN ET AL 3,500,384

CHARGE GATED ANALOG-TO-DIGITAL CONVERTER

Filed Dec. 30, 1966 3 Sheets-Sheet 3

INVENTORS
BOB N. NAYDAN
SIDNEY SACKS

BY Karl A. Ohralik

ATTORNEY

United States Patent Office 3,500,384 Patented Mar. 10, 1970

3,500,384
CHARGE GATED ANALOG-TO-DIGITAL CONVERTER

Bob N. Naydan, Oakland, N.J., and Sidney Sacks, Yonkers, N.Y., assignors to Singer-General Precision, Inc., a corporation of Delaware Filed Dec. 30, 1966, Ser. No. 606,144
Int. Cl. H03k *13/20;* G01r *17/06*
U.S. Cl. 340—347 1 Claim

ABSTRACT OF THE DISCLOSURE

Analog to digital conversion is effected by integrating an analog input potential for an interval of time determined by a preselected count of a counter, then removing the input potential and applying a reference potential of polarity opposite to the input potential polarity and integrating this reference potential until the integral is equal to zero. The time required to bring the integral to zero is measured by the counter which is reset and re-started upon application of the reference potential and stopped at the time of zero integral. The ratio of counter count at zero crossing to the preselected count is a digital representation of the analog input potential.

This invention relates to information processing and, more particularly, to the conversion of information in analog form to digital form.

In servo and other systems, information such as position, temperature, pressure, acceleration, and other types is most effectively derived by analog equipment such as by a resolver or synchro. As an example, the particular orientation of a shaft may be detected by a synchro or resolver connected to and driven by the shaft and the output of such synchro or resolver is an electrical potential, the magnitude of which is analogous to, or proportional to, the position of the shaft. Depending upon the particular adaptation, the analog signal may be of relatively constant direct potential or alternatively, it may be a potential which varies over a relatively wide range and be of both polarities at different times. In systems wherein this information requires further processing or is used in computations, it is often most effectively and expeditiously handled in digital form. Accordingly, for processing the analog information derived as described above, this requires an analog-to-digital converter.

Many types of analog-to-digital converters are well known. In the most effective of these converters, costly ladder networks of precision resistors, expensive switches and relatively complex logic circuitry for controlling the switching and other functions, is required. Thus, the entire converter is too expensive for many applications.

Accordingly, it is a principal object of this invention to facilitate the conversion of information in analog form to digital form with simple, inexpensive, effective apparatus and without the necessity of ladder networks, expensive switches, and complicated logic circuitry.

It is another object of this invention to facilitate the conversion of electrical potentials to digital values corresponding to the magnitudes of the electrical potentials.

Figures 1, 2:
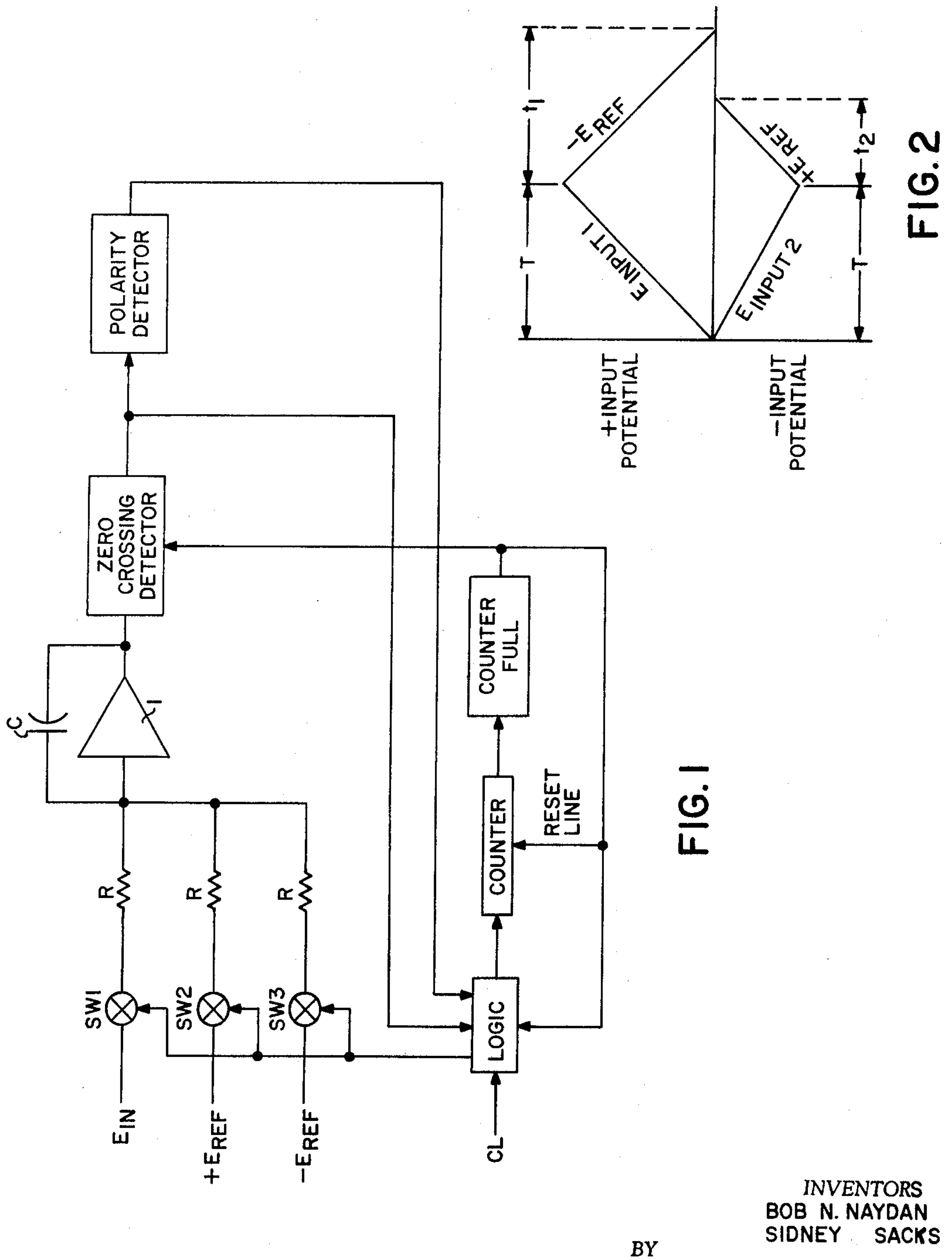
Figure 3:
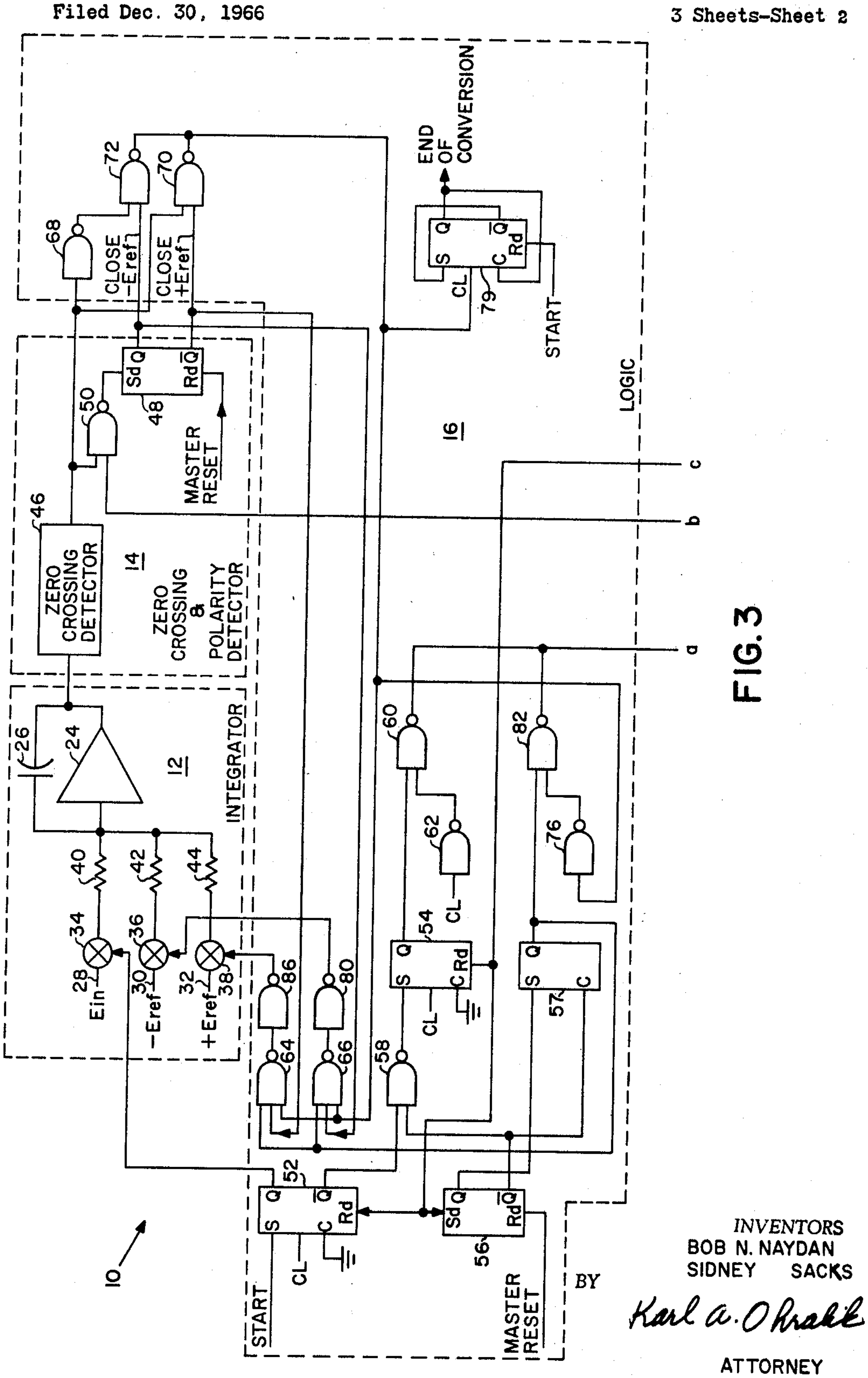
Figure 3A:
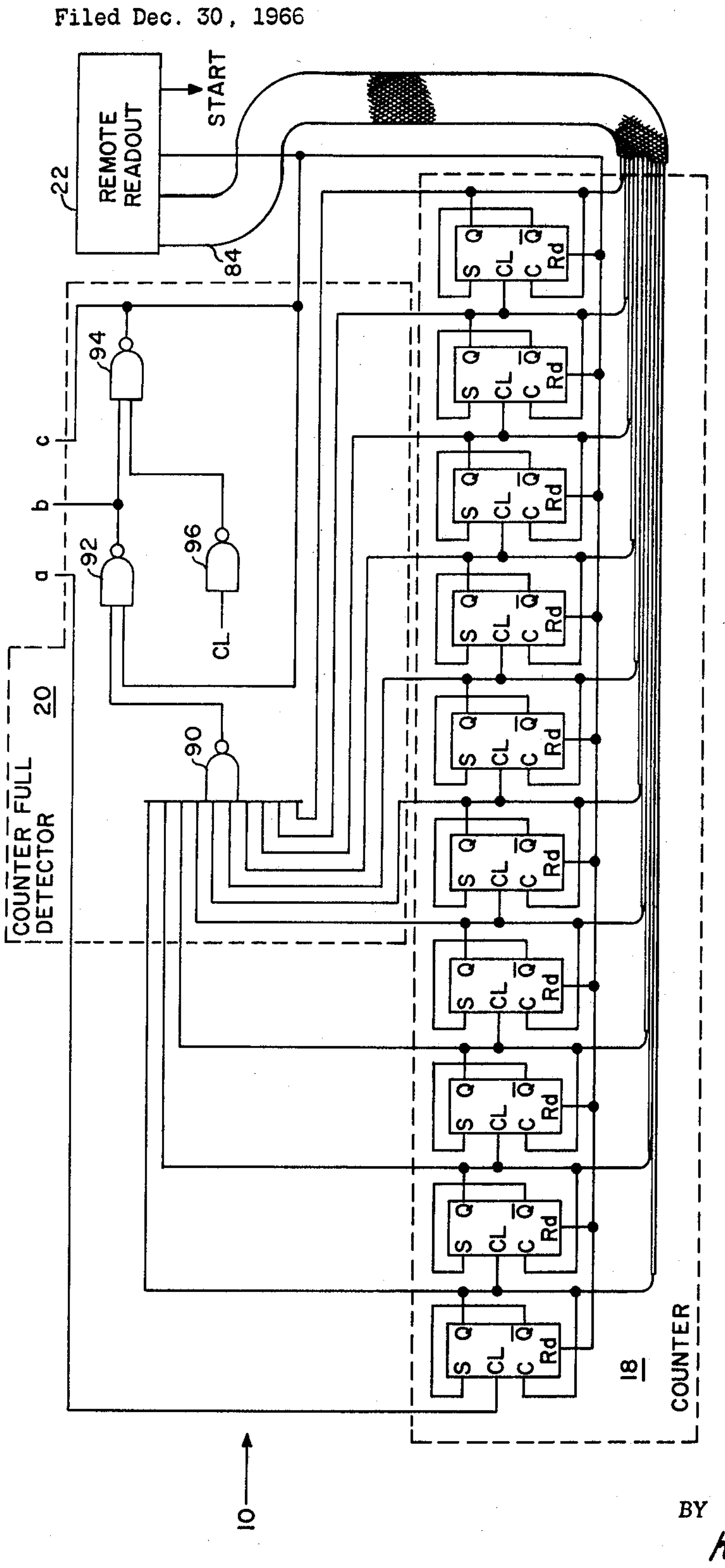

The novel features believed characteristic of the invention are set forth in the appended claims. The invention itself, together with further objects and advantages thereof, may best be understood with reference to the drawings in which:

FIGURE 1 is a block diagram illustrating the principal components of an analog-to-digital converter according to the invention, FIGURE 2 is a graph illustrating timing relationships in the circuit of FIGURE 1, and FIGURES 3 and 3*a* are detailed schematic diagrams of the analog-to-digital converter shown in FIGURE 1.

In accordance with this invention, an analog-to-digital converter is provided which includes a potential integrator to which an incoming analog potential is applied and a digital counting circuit. The analog potential is applied to the integrator for an interval of time as determined by the counter, preferably a full condition, that is, a maximum count of the counter at which time the line of the input signal is interrupted. The counter is reset and is again started counting as a reference potential of a polarity opposite to the polarity of the input signal, as determined by a polarity detector circuit, is applied to the input of the integrator. Thus, the absolute value of the potential of the integrator is reduced. At some instant of time, the absolute value of the potential of the integrator is reduced to zero and the polarity is reversed. A zero crossing detector is provided to sense the zero crossing and to provide an output potential in response thereto. Such a signal is effective to stop the advance of the counter and thus, the count of the counter in relation to the full count represents in digital form the analog input to the converter. For providing a continuous digital representation of analog values, this cycle of events is caused to repeat in relatively rapid succession For a general description of the invention, reference is made to the drawings. In FIGURE 1, the construction of the converter is shown generally in block form and includes a potential integrator in the form of an operational amplifier 1 with a capacitor, C, connected across its input and output. The integrator has three input lines controlled by respective switches SW1, SW2, and SW3 and to which are applied, respectively, the input potential, a positive reference potential and a negative reference potential. A counter circuit and a logic circuit are provided and in the operation of the invention, switch SW1 is closed by the logic circuitry, the counter is started and the input potential is integrated for a full count of the counter requiring some time, T. This is shown in FIGURE 2 of the drawings for the two different polarities of input represented by $E_{INPUT\ 1}$ and $E_{INPUT\ 2}$. A zero crossing detector is coupled to the output of the integrator to detect the change in polarity of such output and a polarity detector is coupled to the output of the zero crossing detector to detect the polarity of the input potential.

After the full count is reached in the counter, the counter full circuit senses this condition and produces a counter reset signal, resetting the counter. Also, the logic circuitry opens switch SW1, and closes either switch SW2 or SW3, depending on the polarity of the incoming potential as determined by the polarity detector, to which the logic circuitry responds. That is, an input line having a reference potential of polarity opposite to the input polarity is applied to the integrator. Simultaneuosly with the application of such reference potential, the counter is again started. The output potential of the integrator therefore progressively decreases in absolute value as indicated by the lines indicated $-E_{REF}$ or $+E_{REF}$ in FIGURE 2 and when zero potential is reached, the zero crossing detector produces an output potential that causes the logic to stop the counter and open the switch in the reference line. The time required for this zero crossing to be reached is indicated in FIGURE 3 by times $t_1$ and $t_2$.

Accordingly, the ratio of time $t_1$ to T or $t_2$ to T is a digital indication of the analog input potential $E_{IN}$.

Referring now to FIGURE 3 of the drawings for a more detailed description of the invention, 10 represents schematically the circuit diagram of the analog- to-digital converter of this invention and includes as principal components the integrator 12, the zero crossing and polarity detector 14, the logic component 16, the counter 18, the counter full detector 20, and a remote readout unit 22. These separate components are delineated by dotted lines enclosing the same for clarity.

The integrator 12 includes an operational amplifier 24 having a capacitor 26 interconnecting its input and output terminals in a conventional manner and has three separate input lines 28, 30, and 32 controlled by respective switches 34, 36 and 38 and being serially connected with respective resistors 40, 42, and 44. The switches 34, 36, and 38 are responsive to positive potentials to close and to zero potential to open. The line 28 serves as the input line to the analog-to-digital converter 10 and such input potential may be many different kinds and may be the output of units such as resolvers, synchros, and other transducers producing potentials representative of physical qualities of pressure temperature and others. It is presumed that if the transducer output is sinusoidal that it has already been processed to yield direct potentials at the input to the converter. These potentials may be of either polarity.

The input line 30 has applied thereto a negative direct reference potential designated $-E_{REF}$ and the line 32 has applied thereto from an external source, a potential designated $+E_{REF}$ designating a positive direct reference potential.

The operational amplifier 24 and capacitor 26 are operative in a well-known manner to provide at its output a potential which is an integral of the potential applied to its input and thus is capable of producing at its output a value which is equal to the respective integrals of positive and/or negative values applied to the input thereof over different periods of time.

The zero crossing and polarity detector 14 includes a zero crossing detector unit 46 which may be any one of various well-known kinds and as such is capable of producing at its output terminal a potential pulse in response to a change of polarity applied to the input thereof. For purposes of this invention, the zero crossing detector 46 is chosen so as to produce a positive output potential at times when a continuous potential of negative polarity is applied to its input and to drop to zero potential output, in response to a change from negative to positive polarity at its input. Also, positive input potential to the detector 46 results in zero output and a change of input polarity causes the output to become positive.

Unit 14 also includes a trigger circuit 48 having respective outputs Q and $\overline{Q}$, which outputs are complements of each other at any instant of time. The trigger 48 is provided with inputs $S_d$ and $R_d$ and is responsive to a zero potential at these respective gates to place the trigger in respective set and reset conditions, respectively. The nature of this trigger is such that it remains in its set or reset state until caused to change by a zero potential input at its alternate input and the application of a positive potential at either of these inputs causes no change in state thereof. In the set condition of the trigger, the Q output is true, that is, of a positive potential and in the reset condition, the $\overline{Q}$ output is true, that is, at a positive potential. The complement condition is a zero potential at either one of the outputs. A NAND circuit 50 is provided in the unit 14 and has a pair of inputs, one of which is connected to the output of the zero crossing and polarity detector 46. The NAND circuit is of a well-known type which is responsive to a coincidence of positive potentials applied to its inputs to produce a zero potential output and is also responsive to a zero potential applied to either one of its inputs to produce a positive output potential.

The logic unit 16 includes a pair of triggers 52 and 54 which have complementary outputs Q and $\overline{Q}$ and also have inputs designated S and C. Another input designated CL for clock line, receives clock pulses from a source of any suitable type. The triggers 52 and 54 are responsive to positive potentials applied at either one of the inputs S or C to assume a particular condition of set or reset equilibrium in response to a coincident clock pulse applied when the appropriate input is conditioned. Thus, in response to a positive pulse applied to the S input of the trigger, a clock pulse occurring during such input causes the trigger to assume a condition wherein the Q output is positive and the $\overline{Q}$ output is substantially zero. The C inputs are grounded to prevent the possibility of reset potential at these inputs. Each of these triggers also has an $R_d$ input responsive to zero potentials for resetting the trigger without the necessity of a clock pulse. That is to say, a zero potential applied to either one of the inputs $R_d$ of these triggers is effective to reset the trigger whereby the Q output is zero and the $\overline{Q}$ output in the case of trigger 52, is high. A start signal derived from remote readout unit 22 is applied to the S input of trigger 52 and initiating the operation of the circuit, a start pulse of positive potential is applied to this line. The Q output terminal of trigger 52 is connected to control switch 34. Another trigger 56, of the type shown at 48, is providde and has its resetting terminal $R_d$ connected to a signal designated master reset derived from remote readout unit 22 and which is applied just prior to the initiation of a conversion operation. A NAND circuit 58 is provided and has its two inputs connected respectively to the $\overline{Q}$ outputs of triggers 52 and 56 and the output of NAND circuit 58 is applied to the S input of trigger 54. Thus, the trigger sets in response to a coincidence of a positive potential at this S input and a clock pulse applied at its CL input. The output of trigger 54 is applied to one input of a NAND circuit 60, the other input being connected to an output of another NAND circuit 62 which, in turn, has a single input receiving clock pulses, designated CL. The NAND circuit 62 thus serves purely as an inverter and in circumstances wherein the output of trigger 54 is a positive potential, the output of NAND circuit 60 follows the clock pulses applied to the input of 62. The output of the NAND circuit 60 is applied to the input of the counter 18 and causes the stepping of the counter.

The Q and $\overline{Q}$ outputs of trigger 56 are applied to respective S and C inputs of a trigger 57. The Q output of this trigger is applied to one of the three inputs of each of the NAND circuits 64 and 66 each of which has a second input connected to respective outputs Q and $\overline{Q}$ of trigger circuit 48 in the zero crossing and polarity detector unit 14 and designated CLOSE $+E_{REF}$ and CLOSE $-E_{REF}$.

The output of zero crossing detector 46 is applied to the single input of a NAND circuit 68 serving as an inverter and is also applied to one input of a NAND circuit 70. The output of NAND circuit 68 is applied as one of the two inputs of NAND circuit 72, the other being connected to the output Q of trigger 48. The second input to NAND circuit 70 is connected to the $\overline{Q}$ output of trigger 48. The outputs of NAND circuits 70 and 72 are joined and are applied to the third inputs of each of the NAND circuits 64 and 66, to the clock line of a trigger circuit 79 and to the single input of a NAND circuit 76. The outputs of NAND circuits 64 and 66 are applied to the single inputs of respective NAND circuits 86 and 80 serving purely as inverters and the outputs of these inverters are applied to respective switches 38 and 36. The output of NAND circuit 76 and the Q output of trigger 57 are applied to the two respective inputs of a NAND circuit 82 the output of which is connected to the line serving as the input to the counter 18.

The trigger 79 is of the type commonly known as the J–K type and has its $\overline{Q}$ output connected to its S input, its Q output connected to its C input and its $R_d$ input connected to a signal designated $\overline{START}$ which is a negative potential pulse serving to reset the trigger. This trigger 79 thus is responsive to a negative going leading edge of a potential pulse applied to its clock line input to change state.

The counter 18 is comprised of 10 bistable triggers of the J–K type at 79 and the output of the first through ninth of the triggers is connected to the clock line input of the following trigger. Thus the counter is of the binary type serving to count to $2^{10}$. The output of each individual stage of the counter is connected through a cable designated 84 and applied to the remote readout unit 22. This readout unit 22 may be of the type having provisions for storing the count delivered by the counter at any particular instant of time and also to provide a start signal after such storing operation is performed. The start signal is applied to a start line indicated by the legend "Start" in FIGURES 3 and 3*a*. The remote readout unit 22 is also capable of producing a reset pulse on a reset output line after a storing operation is performed.

The outputs of each of the individual stages of the counter 18 are also applied to the respective inputs of a NAND gate 90 in counter full unit 20. The NAND gate 90 may take the form of combined NAND gates or other logic circuitry performing the equivalent function. The counter full unit 20 also includes three additional NAND gates 92, 94, and 96 connected in a latch type circuit wherein the output of NAND gate 90 is connected to one of the inputs of gate 92, having its other input connected to the output of NAND gate 94. The output of NAND gate 92 is connected to one of the inputs of NAND gate 94 and the other input of this gate is connected to the output of NAND gate 96. Pulses from the clock line designated CL are applied to the input of the NAND gate 96 as indicated. The counter full unit produces a zero potential, counter-full pulse at the output of NAND gate 94 which is applied to the resetting inputs $R_d$ of all of the triggers of the counter 18 and is also applied to the resetting inputs $R_d$ of triggers 52 and 54 and to the setting inputs $S_d$ of trigger 56. The output of NAND gate 92 is applied as a second input to the NAND gate 50 in the zero crossing and polarity detector unit 14.

A better understanding of the invention may be had from the following description of the operation of the circuit 10. It is assumed that all electrical power is supplied to the respective circuits involved in the converter 10 and that the remote readout unit 22 is caused to supply a reset pulse which is applied to the counter circuit 18 to reset all of the individual stages of the counter, to trigger 48 and to trigger 56 resetting each of these triggers. A suitable clock pulse such as a square wave is applied on the line designated CL from a source not shown and a start pulse from unit 22 is applied to triggers 52 and 79. The start pulse causes the trigger 52 to be set in response to the first incoming clock pulse signal after the start potential is applied and the Q output of the trigger 52 in a set condition of the trigger becomes positive or in terms of logic, a logical 1. This causes the switch 34 to close. The start pulse is also effective to cause the end of conversion trigger 79 to reset. The circuit 10 is effective to produce a digital output in response to either polarity of input potentials however, it is arbitrarily assumed that a positive direct potential is applied on input line 28 to be converted to its digital equivalent. In response to the closure of switch 34 and the application of a positive input potential on line 28, the integrator 12 produces a negative potential at the output of amplifier 24 which is applied to the input of the zero crossing detector 46. By the nature of the zero crossing detector 46, a negative potential applied at its input produces a positive potential at its output.

The output $\overline{Q}$ of trigger circuit 52 is applied to one of the inputs of NAND gate 58 and because the potential $\overline{Q}$ is zero or logical zero, the output of NAND gate 58 is a logical one causing the trigger 54 to set in response to the next incoming clock pulse. The output Q of trigger 54 becomes a logical 1 and is applied to one input of NAND gate 60. Thus, the clock pulses applied to the input of NAND gate 62 are repeated at the output of NAND gate 60 and applied to the incoming stage of the counter 18, causing the counter to progressively register the incoming pulses of the clock.

The situation just described hereinabove prevails until the counter 18 progresses to a full count, that is, wherein each one of the individual stages of the counter becomes set. In such a condition, the Q outputs are all logical 1 and being applied to the inputs of NAND gate 90 cause the output of this gate to assume a logical zero condition. It is noted that prior to the counter full condition, one or more of the inputs to the NAND gate 90 were at logical zero, producing a logical 1 at its output. Also, the clock pulses applied to the input of NAND gate 96 cause the output of this NAND gate to alternate between logical zero and logical one conditions and thus also causing the output of NAND gate 94 at some time to become logical one. Thus, both inputs to the NAND gate 92 would be logical 1 causing a logical zero output and assuring therefore the output of NAND gate 94 to be logical 1. Once this condition is established, the circuit including the three NAND gates 92, 94, and 96 remains in this condition until a logical zero signal is applied from the output of NAND gate 90. Thus, as the counter full condition causes this logical zero output condition to occur, the output of NAND gate 92 causes a positive potential pulse to be applied to one input of NAND gate 50. This pulse together with the positive potential produced at the output of the zero crossing detector 46 causes the output of NAND gate 50 to assume a logical zero condition causing the trigger circuit 48 to become set whereby its Q output becomes positive or logical 1 and its $\overline{Q}$ output becomes zero or logical zero. The Q output of trigger 48 is also designated "CLOSE $-E_{REF}$" indicating that a positive signal on this line is effective to close switch 36 applying a $-E_{REF}$ potential to the input to integrator 12. To achieve this result, all of the inputs to NAND gate 66 must be conditioned or in other words, at logical one conditions. The positive potential applied to the input of NAND gate 68 is inverted to a zero potential at its output and, thus, the output of NAND gate 72 becomes positive or a logical one. Also, the logical zero condition at $\overline{Q}$ of trigger 48 causes the output of NAND gate 70 to be at a positive or logical 1 condition, thus, conditioning one of the inputs of NAND gates 64 and 66.

The previously described positive output pulse of NAND gate 92 is also applied to the input of NAND gate 94 and together with the next inverted clock pulse applied to the other input of NAND gate 94 causes the output of this NAND gate to become logical zero and, thus, resetting each of the triggers 52, 54, and setting of the trigger 56. The set condition of trigger 56 causes its Q output to become logical 1, setting trigger 57. Its Q output becomes logical 1 to condition the second input of the NAND gate 66. The third input of the NAND gate 66 has applied thereto the "CLOSE $-E_{REF}$" signal derived from the Q output of the trigger 48 and, thus, all three inputs to this NAND gate are conditioned whereby its output becomes logical zero and the output of NAND gate 80 becomes logical 1, closing the switch 36. The $-E$ potential applied to input line 30 is applied to the input of amplifier 24 through the resistor 42. In this condition, the output potential of the amplifier 24 gradually diminishes in absolute value towards zero and ultimately reaches a zero condition and crosses the zero reference line. The zero crossing detector 46 senses this condition and its output drops suddenly from a positive value to a zero or logical zero value. The output of NAND gate 50 becomes logical 1, however, this has no effect on the trigger 48 which requires a zero potential at input $R_d$ to reset. The logical zero output of zero crossing detector 46, however, is inverted and applied to one input of NAND gate 72. Accordingly, both inputs to this NAND gate are logical 1 and its output becomes logical zero. This zero potential has several effects. As applied to trigger 79, it causes this trigger to change to the set state, producing an "end of conversion" signal at its Q output. Also this zero potential applied to one of the inputs of NAND gate 66 causes switch 36 to be opened to terminate the application of reference potential to the input amplifier 24. Still further, this zero potential is inverted by NAND gate 76 whereby both inputs to NAND gate 82 are logical 1 since trigger 57 is set, the output of NAND gate 82 is zero, applying ground to the input to counter 18 terminating its counting progression. The count value of the counter indicates the time during which the negative direct reference potential was applied to the input of the integrating amplifier 24. Because this length of time is an indication of the time required for the application of this negative reference potential to bring the previously integrated positive input potential back to zero, it is also an indication therefore of the magnitude of the previous positive input potential. The conditions of the individual stages of the counter 18 are sensed by connections to the Q outputs thereof and applied along a cable 84 to the remote readout unit 22 which may have a visual display or other recording device for recording the count of the counter. The end of conversion signal is applied to the remote readout unit 22 to appropriately condition the circuitry of unit 22 to record the count of the counter 18 and to thereafter produce a reset pulse and a start pulse to again cause a cycle of events to occur whereby the digital equivalent of the incoming applied potential at another time is determined. Necessarily, this cycle is repeated rapidly a large number of times in a unit of time whereby a more accurate indication of incoming potential is determined.

It is to be noted that the circuit 10 is also responsive to negative incoming potentials applied to the input line 28 to produce a digital equivalent in the counter 18. In this circumstance, the output of the integrating amplifier 24 would be positive, the output of the zero crossing detector 46 would be zero until a zero crossing point is achieved and at the counter full condition in this circumstance, the trigger 48 is not caused to change state. The trigger 48 remaining reset has a positive potential at output $\overline{Q}$ and a "CLOSE $+E_{REF}$" signal is derived whereby the switch 38 becomes closed to apply the appropriate positive reference potential. The zero crossing of integrated input in this case produces a logical 1 input to NAND gate 70 and the $\overline{Q}$ output of trigger 48 produces the second logical input to this NAND gate whereby its output becomes zero. This potential has the same effect as described hereinabove in stopping the counter, opening switch 38 and producing an end of conversion signal from trigger 79.

What is claimed is:

1. An analog-to-digital converter comprising an integrator having a plurality of input lines selectively connectable thereto, counter means for counting time intervals at a uniform rate, means for connecting only one of said lines to said integrator for the time interval required for said counter to reach a predetermined count, zero crossing detector means coupled to the output of said integrator and being responsive thereto for producing an output signal of predetermined polarity, said detector means being further responsive to a change in the polarity of its input signal to change the polarity of its output signal, and means responsive to said predetermined count for disconnecting said one line and for connecting only one of the other of said lines to said integrator and for operating said counter from the time of said connection and during the absence of a change in the polarity of the output signal from said zero crossing detector means, said means responsive to said predetermined count including: trigger circuit means having a pair of output terminals and being capable of assuming two different states of equilibrium in each of which the potentials at said output terminals are complementary and in which the outputs of the same terminal in different states are complementary, means for producing a potential pulse of said predetermined polarity in response to said predetermined count of said counter, coincident circuit means having inputs coupled to said zero crossing detector and said pulse producing means and having an output coupled to an input of said trigger circuit, said coincident circuit means being responsive to a coincidence of potentials of said predetermined polarity applied to its inputs to produce an output potential of a specific polarity, said trigger circuit being responsive to potential of said specific polarity applied to its input to assume a first condition of equilibrium and means for establishing a second condition of equilibrium of said trigger circuit prior to initiating count of said counter whereby the potentials at the two outputs of said trigger are representative of the polarity of potential applied along said others of said lines to said integrator, respectively; wherein said means for producing said potential pulse of predetermined polarity in response to said counter comprises: a first gate means responsive to said counter and being coupled to a second gate means, said second gate means having an output coupled to the input of a third gate means, and a fourth gate means having an input responsive to a series of periodic clock pulses and an output also being coupled to the input of said third gate means, said third gate means output being applied as a second input to said second gate means whereby said second gate means produces said pulse of predetermined polarity only when said counter has reached said predetermined count and said third gate means output produces a pulse of opposite polarity effective to disconnect said one line from said integrator.

References Cited

UNITED STATES PATENTS

| | | | |
|---|---|---|---|
| 3,316,547 | 4/1967 | Ammann | 340—347 |
| 3,368,149 | 2/1968 | Wasserman | 340—347 |

MAYNARD R. WILBUR, Primary Examiner

MICHAEL K. WOLENSKY, Assistant Examiner

U.S. Cl. X.R.

324—99